(12) United States Patent
Radic (10) Patent No.: US 10,461,626 B1
(45) Date of Patent: Oct. 29, 2019

(54) ACTIVE CLAMP CIRCUIT

(71) Applicant: Silanna Asia Pte Ltd, Singapore (SG)

(72) Inventor: Aleksandar Radic, Toronto (CA)

(73) Assignee: Silanna Asia Pte Ltd, Singapore (SG)

( * ) Notice: Subject to any disclaimer, the term of this patent is extended or adjusted under 35 U.S.C. 154(b) by 0 days.

(21) Appl. No.: 16/247,227

(22) Filed: Jan. 14, 2019

(51) Int. Cl.
*H02M 1/08* (2006.01)
*H02M 1/32* (2007.01)
*H02M 3/335* (2006.01)

(52) U.S. Cl.
CPC ............ *H02M 1/08* (2013.01); *H02M 1/32* (2013.01); *H02M 3/33592* (2013.01); *H02M 2001/327* (2013.01)

(58) Field of Classification Search
CPC ......... H02M 3/33546; H02M 3/33515; H02M 3/33523; H02M 3/33507; H02M 3/3353; H02M 3/33553
USPC ........................................... 363/21.12–21.18
See application file for complete search history.

(56) References Cited

U.S. PATENT DOCUMENTS

| | | | |
|---|---|---|---|
| 5,796,595 A | 8/1998 | Cross | |
| 6,069,803 A | 5/2000 | Cross | |
| 6,452,818 B1 | 9/2002 | Simopoulos | |
| RE38,196 E | 7/2003 | Vinciarelli et al. | |
| 7,606,051 B1 | 10/2009 | Wittenbreder | |
| 9,246,391 B2 | 1/2016 | Berghegger | |
| 2003/0179592 A1* | 9/2003 | Nishiyama | H02M 3/33569 363/20 |
| 2005/0201128 A1 | 9/2005 | Jin et al. | |
| 2006/0013021 A1 | 1/2006 | Aso | |
| 2008/0315858 A1 | 12/2008 | Hong et al. | |
| 2009/0073725 A1 | 3/2009 | Lin | |
| 2014/0233275 A1 | 8/2014 | Yang et al. | |
| 2014/0268914 A1* | 9/2014 | Wang | H02M 3/33592 363/21.13 |
| 2015/0003121 A1 | 1/2015 | Yang et al. | |
| 2015/0263639 A1 | 9/2015 | Russell et al. | |
| 2015/0357904 A1 | 12/2015 | Odell et al. | |

(Continued)

FOREIGN PATENT DOCUMENTS

| | | |
|---|---|---|
| CN | 102208873 A | 10/2011 |
| JP | 2009290932 A | 12/2009 |

(Continued)

OTHER PUBLICATIONS

International Search Report dated Apr. 26, 2019 for PCT Patent Application No. PCT/IB2018/060252.

(Continued)

*Primary Examiner* — Nguyen Tran
(74) *Attorney, Agent, or Firm* — MLO, a professional corp.

(57) ABSTRACT

An active clamp circuit includes an active clamp switch having a drain node and a source node, an active clamp capacitor coupled in a series combination with the active clamp switch, a delay circuit, and an active clamp controller circuit coupled to the active clamp switch and to the delay circuit. The active clamp controller circuit is configured to i) receive an active clamp switch voltage based on a voltage developed across the drain node and the source node of the active clamp switch, ii) enable the active clamp switch based on a voltage amplitude of the active clamp switch voltage, and iii) disable the active clamp switch based on a delay signal generated by the delay circuit.

17 Claims, 6 Drawing Sheets

(56) References Cited

U.S. PATENT DOCUMENTS

| | | | |
|---|---|---|---|
| 2016/0072399 A1* | 3/2016 | Kikuchi | H02M 3/33592 363/21.14 |
| 2016/0365801 A1 | 12/2016 | Phadke | |
| 2017/0070152 A1 | 3/2017 | Liu | |
| 2018/0115252 A1 | 4/2018 | Chang et al. | |
| 2018/0175725 A1 | 6/2018 | Hu et al. | |
| 2018/0226895 A1 | 8/2018 | Song et al. | |
| 2018/0254710 A1 | 9/2018 | Wang et al. | |
| 2018/0287481 A1 | 10/2018 | Liu et al. | |
| 2019/0044449 A1 | 2/2019 | Li et al. | |
| 2019/0044450 A1 | 2/2019 | Muto et al. | |
| 2019/0149052 A1 | 5/2019 | Gong et al. | |

FOREIGN PATENT DOCUMENTS

| | | |
|---|---|---|
| KR | 20160125676 A | 11/2016 |
| KR | 20170106204 A | 9/2017 |
| WO | 2017095408 A1 | 6/2017 |

OTHER PUBLICATIONS

International Search Report dated May 31, 2019 for PCT Patent Application No. PCT/IB2019/050686.
Notice of Allowance dated Apr. 17, 2019 for U.S. Appl. No. 16/221,945.
Office Action dated Jul. 29, 2019 for U.S. Appl. No. 16/145,819.

\* cited by examiner

ACTIVE CLAMP CIRCUIT

RELATED APPLICATION

This application is related to U.S. patent application Ser. No. 16/145,819, filed Sep. 28, 2018, and entitled "Integrated Self-Driven Active Clamp," all of which is incorporated by reference herein in its entirety.

BACKGROUND

Switch-mode power supplies (SMPS) are power management components in modern electronic devices. They provide, among other things, efficient and galvanically isolated power to multiple loads. To achieve high power processing efficiency and/or galvanic isolation, conventionally one or more magnetically coupled elements, semiconductor switches and associated gate driver circuits are required.

The magnetically coupled elements often suffer from non-trivial leakage inductance phenomena, which necessitate the need for affordable voltage snubber circuits to control the semiconductor switch peak drain-to-source voltages. Because of the price-sensitive nature of SMPS, the snubber circuits are conventionally limited to the cost-effective passive and power lossy resistor-capacitor-diode (RCD) configurations.

SUMMARY

In some embodiments, an active clamp circuit includes an active clamp switch having a drain node and a source node, an active clamp capacitor coupled in a series combination with the active clamp switch, a delay circuit, and an active clamp controller circuit. The active clamp controller circuit is coupled to the active clamp switch and to the delay circuit. The active clamp controller circuit is configured to i) receive an active clamp switch voltage based on a voltage developed across the drain node and the source node of the active clamp switch, ii) enable the active clamp switch based on a voltage amplitude of the active clamp switch voltage, and iii) disable the active clamp switch based on a delay signal generated by the delay circuit.

In some embodiments, a power converter includes a transformer having a primary winding and a secondary winding. A first winding node of the primary winding is configured to be coupled to a voltage source to receive an input voltage. The secondary winding is configured to be coupled to a load to provide an output voltage from the input voltage. The power converter includes an active clamp circuit and a main switch coupled to a second winding node of the primary winding to control a current through the primary winding. The active clamp circuit includes an active clamp switch having a drain node and a source node, an active clamp capacitor coupled in a series circuit combination with the active clamp switch, a delay circuit, and an active clamp controller circuit. The active clamp controller circuit is coupled to the active clamp switch and to the delay circuit. The active clamp controller circuit is configured to i) receive an active clamp switch voltage based on a voltage developed across the drain node and the source node of the active clamp switch, ii) enable the active clamp switch based on a voltage amplitude of the active clamp switch voltage, and iii) disable the active clamp switch based on a delay signal generated by the delay circuit.

DETAILED DESCRIPTION

Some embodiments described herein provide a low-cost self-driven active clamp circuit and self-driven active clamping methods for use in a power converter that converts an input voltage to an output voltage using a transformer. In some embodiments, the self-driven active clamp described herein replaces a diode of a resistor-capacitor-diode (RCD) snubber circuit of a conventional power converter, advantageously converting the conventional power converter into a power converter having self-driven active clamping without needing to change additional control circuits of the power converter (such as a primary-side power management integrated circuit, or a secondary side synchronous switch controller integrated circuit). In other embodiments, the self-driven active clamp circuit is integrated into an initial design of a power converter. In either embodiment, control of the power converter is advantageously simplified as compared to conventional solutions.

In systems sensitive to power losses and heat generation, the dissipation in lossy components in the form of heat is unsuitable. Thus, recycling of energy using an active clamping configuration within the system provides an opportunity for system form-factor reduction and power efficiency improvement. Additionally, clamping the maximum drain-source voltages of switching power transistors allows for increased device reliability and use of power transistors with improved figure-of-merit (FOM). The improved FOM enables the SMPS to operate at higher switching frequency while maintaining high power processing efficiency. Furthermore, clamping the maximum drain-source voltages of switching power transistors allows for a reduction of the SMPS reactive component size and cost.

The self-driven active clamp circuit, as compared to an RCD snubber circuit, advantageously increases power processing efficiency of a power converter by recycling energy stored in a leakage inductance of the transformer. In accordance with some embodiments, the self-driven active clamp circuit clamps a primary side peak voltage of a main switch of the power converter, which enables the power converter to utilize primary side and/or secondary side switches having a lower voltage rating, leading to reduced power losses during switch conduction and/or switching.

In some embodiments, the self-driven active clamp circuit enables an active clamp switch based on a comparison between a reference voltage to a voltage, or an attenuated representation of the voltage, developed across a drain node and a source node of the active clamp switch. In such embodiments, the self-driven active clamp circuit disables the active clamp switch at the expiration of a delay. The delay is initiated in response to the active clamp switch being enabled. In such embodiments, the active clamp circuit advantageously can be implemented using low-cost voltage comparison amplifiers. Additionally, an on-time of the self-driven active clamp circuit can be advantageously reduced as compared to conventional active clamp solutions because the active clamp switching does not need to coincide with a main switch turn-on time. As a result, a smaller active clamp capacitor can be utilized as compared to that used in conventional clamping circuits because the active clamp circuit resonant period is shorter. Because the active clamp capacitor is a high voltage component, using a smaller capacitance can result in significant cost reduction benefits.

Figure 1:
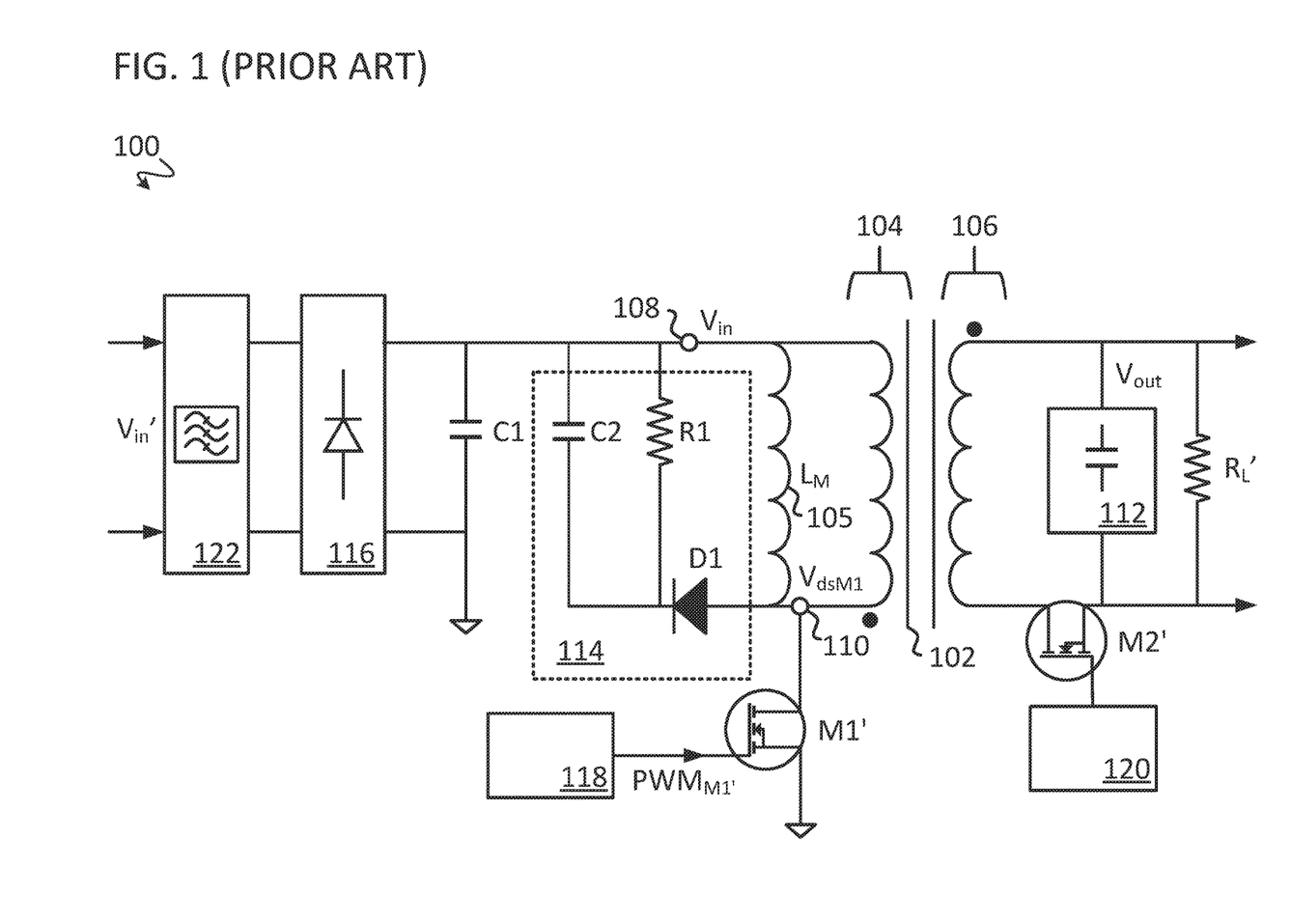
FIG. 1 is a simplified circuit schematic of a conventional power converter.

FIG. 1 is a simplified circuit schematic of a conventional power converter ("converter") 100. Some elements of the converter 100 have been omitted from FIG. 1 to simplify the description of converter 100 but are understood to be present. A voltage source $V_{in}'$ is received at the converter 100. $V_{in}'$ can be provided either as an alternating current (AC) or direct current (DC). An input side of the converter 100 generally includes an input voltage filter block 122, a rectifier block 116 (in the case of AC input), an input voltage buffer capacitor C1, an RCD snubber circuit block 114 (which includes a capacitor C2, a resistor R1 and a diode D1), a main switch M1' driven by a pulse-width-modulation (PWM) signal $PWM_{M1'}$, and a main switch controller circuit ("controller") 118. The input voltage filter block 122, rectifier block 116 and the input buffer capacitor C1 provide a filtered, buffered, rectified, or otherwise conditioned input voltage $V_{in}$ to a transformer 102.

The transformer 102 transfers power from the input side of the converter 100 to an output side of the converter 100 and generally includes a primary winding 104 with a first node 108 and a second node 110, and a secondary winding 106. The output side of the converter 100 generally includes an output buffer circuit 112, a synchronous rectifier switch M2', a synchronous rectifier switch controller circuit ("controller") 120, and a load $R_L'$.

The first node 108 receives $V_{in}$. The second node 110 is coupled to a drain node of the main switch M1'. The main switch M1' controls a current through the primary winding 104 to charge a magnetizing inductance $L_M$ 105 of the transformer 102 during a first portion of a switching cycle of the converter 100. The synchronous rectifier switch M2' controls a current flow through the secondary winding 106 to discharge the transformer 102 into output buffer circuit 112 and the load during a subsequent portion of the switching cycle.

When the main switch M1' is enabled by the controller 118 during the first portion of a switching cycle, current flows through the primary winding 104 to a voltage bias node such as ground. The current flow through the primary winding 104 causes energy to be stored in the magnetization inductance $L_M$ 105 and a leakage inductance $L_L$ (not shown) of the transformer 102. When the main switch M1' is disabled in a subsequent portion of the switching cycle, output voltage $V_{out}$ is generated at the output buffer circuit 112 and is provided to the load $R_L'$. When the main switch M1' is turned off, a reflected voltage ($nV_{out}$) is developed at a drain node of the main switch M1' at the second node 110. The contribution of the reflected voltage $nV_{out}$ to a drain-source voltage $V_{dsM1}$ of the main switch M1' at the second node 110 is expressed as:

$$V_{dsM1} = V_{in} + nV_{out} \quad \text{(Equation 1)}$$

where n is a turns ratio of the transformer 102. Energy stored in the leakage inductance $L_L$ of the transformer 102 also contributes to the voltage $V_{dsM1}$ developed at the second node 110.

The RCD snubber circuit 114 prevents the voltage $V_{dsM1}$ from increasing to a level that damages the main switch M1'. As $V_{dsM1}$ rises, the diode D1 becomes forward biased and current flows into the capacitor C2 and into the resistor R1 to dissipate energy, thereby clamping $V_{dsM1}$ to a level that is within a safe operating range of the main switch M1'. However, in systems sensitive to power losses and heat generation, the dissipation in lossy components (e.g., the resistor R1) in the form of heat is unsuitable. To further increase the efficiency of the converter 100, the diode D1 can be replaced with an actively driven clamp switch driven by an active clamp drive signal. However, conventional active clamping circuits require a control signal or other means of synchronization from the controller 118. Thus, a converter 100 that uses a controller 118 that is not already configured to support conventional active clamping cannot easily be modified to implement active clamping.

Figure 2:
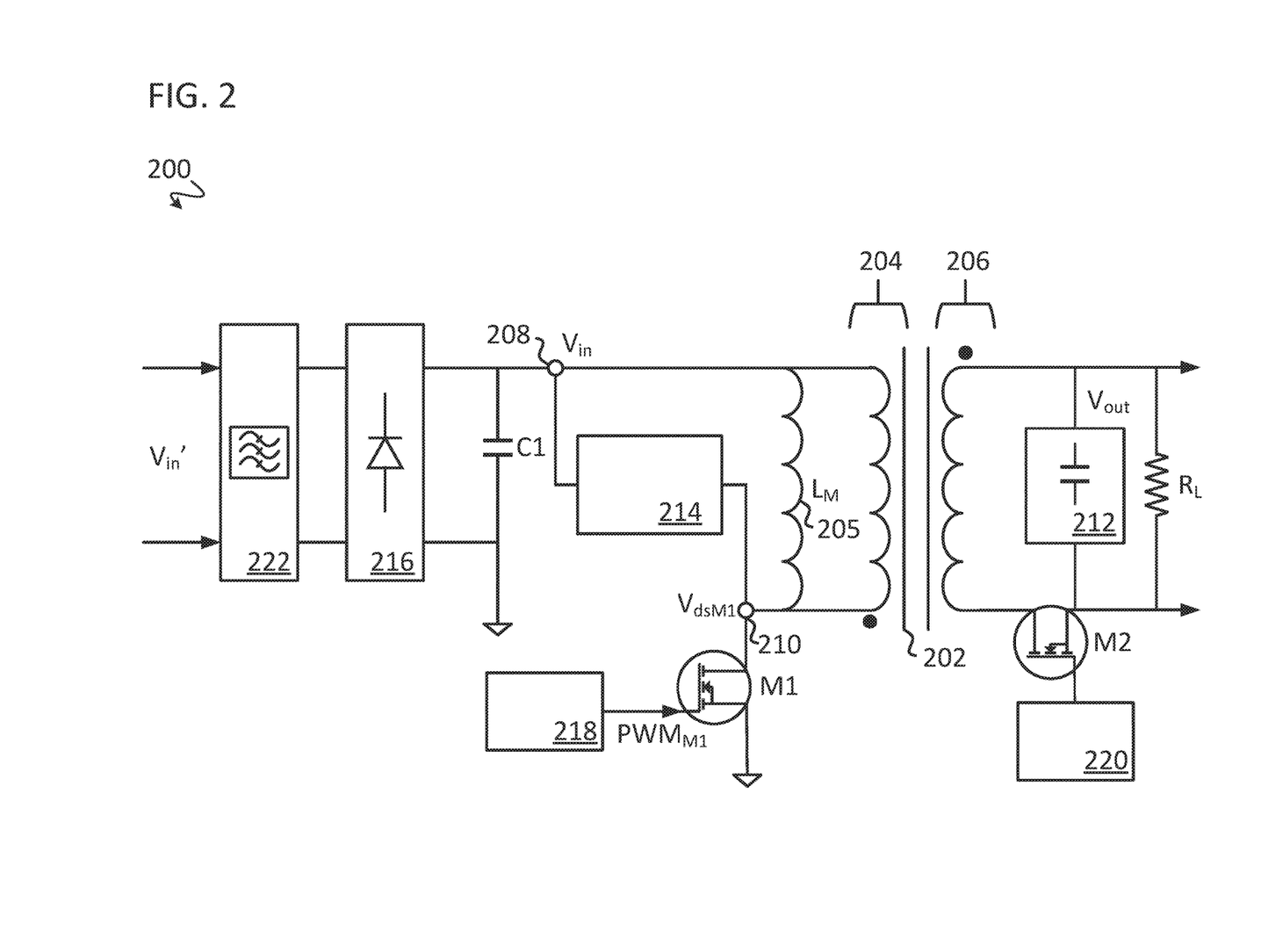
FIG. 2 is a simplified circuit schematic of a power converter, in accordance with some embodiments.

FIG. 2 is a simplified circuit schematic of a power converter ("converter") 200 with a self-driven active clamp circuit 214, in accordance with some embodiments. Some elements of the converter 200 have been omitted from FIG. 2 to simplify the description of the converter 200 but are understood to be present. Some elements of the converter 200 are similar to elements of the converter 100 (e.g., the main switch M1 is similar to the main switch M1'). However, in the embodiment shown, all, or a portion (e.g., the diode D1), of the snubber circuit 114 of the converter 100 has been replaced with the self-driven active clamp circuit ("active clamp circuit") 214. In some embodiments, the resistor R1 of the conventional RCD 114 can advantageously be omitted from the active clamp circuit 214, providing further cost savings and improvements in power efficiency. In general, the converter 200 includes an input side configured to receive an input voltage, and an output side configured to provide an output voltage from the input voltage, the input side being coupled to the output side by a transformer 202. The transformer 202 transfers power from the input side of the converter 200 to the output side of the converter 200 and generally includes a primary winding 204 and a secondary winding 206. The primary winding 204 includes a first winding node 208 and a second winding node 210. The input side of the converter 200 generally includes an input filter block 222, a rectifier block 216, an input voltage buffer capacitor C1, a main switch M1, a self-driven active clamp circuit ("active clamp circuit") 214, and a main switch controller 218. A magnetizing inductance $L_M$ of the transformer 202 is illustrated as a winding 205. Similar to that as was described with reference to the node 108 and the node 110 of FIG. 1, the node 208 receives an input voltage $V_{in}$ and a node 210 receives a drain-source voltage $V_{dsM1}$ of the main switch M1.

The output side of the converter 200 generally includes an output buffer 212, a synchronous rectifier switch M2, a synchronous rectifier switch controller circuit ("controller") 220, and a load $R_L$. As shown, the self-driven active clamp circuit 214 is connected between the node 208 and the node 210. In some embodiments, one or both of the main switch M1 and/or the synchronous rectifier switch M2 are field-effect transistors (FETs), each having a drain node, a source node, and a gate node to control a conduction of current between the drain node and the source node. In other embodiments, the synchronous rectifier switch M2 is replaced with a diode.

Figure 3:
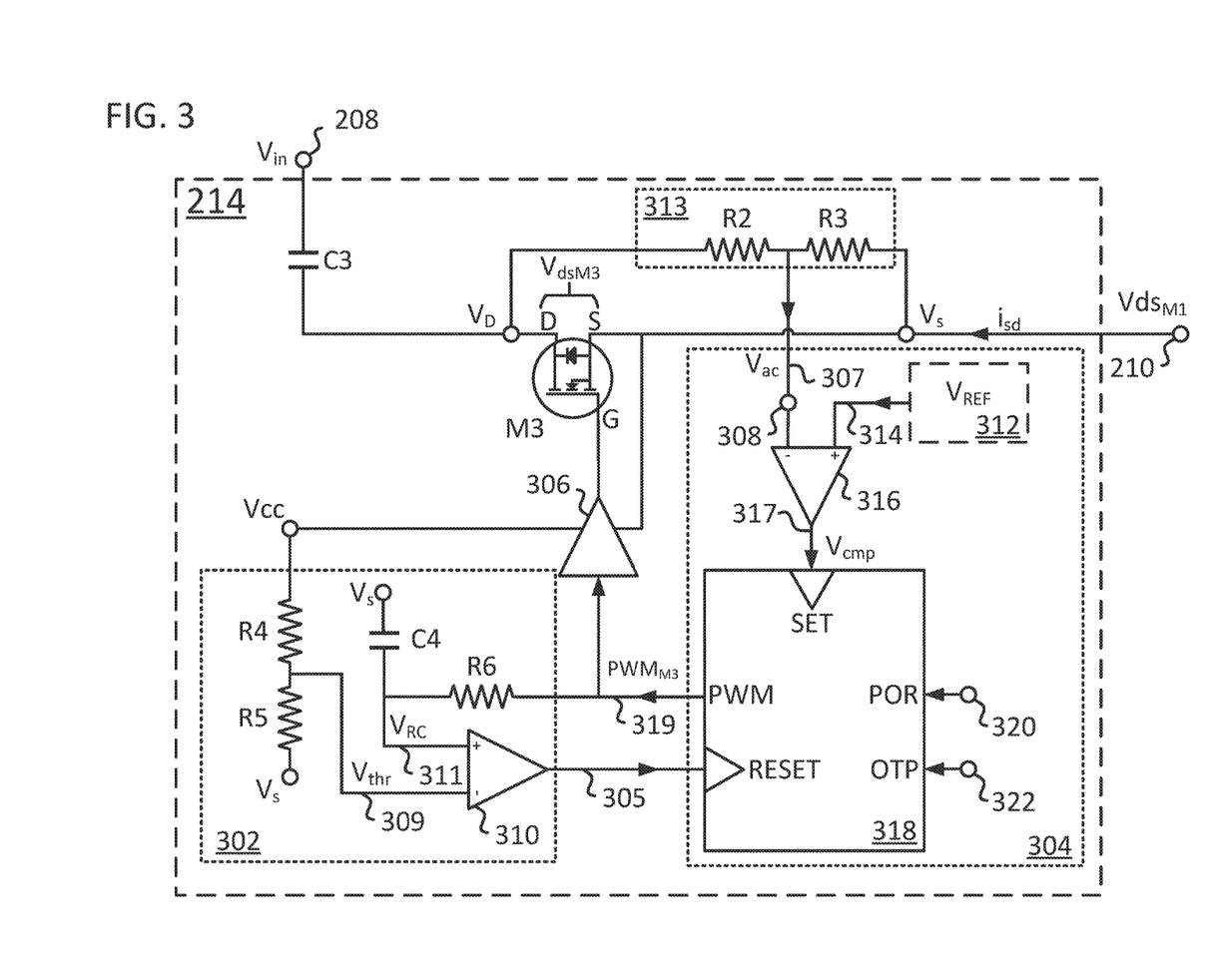
FIG. 3 is a simplified circuit schematic of a low-cost self-driven active clamp circuit, e.g., for use in the power converter shown in FIG. 2, in accordance with some embodiments.

Advantageously, in some embodiments, the active clamp circuit 214 can replace the snubber circuit 114 of the converter 100 without making significant modifications to the converter 100 (e.g., it does not require a control signal or other synchronization signal from the controllers 218, 220). Thus, in such embodiments, a converter 100 that was manufactured with a snubber circuit similar to the snubber circuit 114 can be modified with the self-driven active clamp circuit 214 to perform active clamping. For example, in some embodiments, the diode D1 of the conventional snubber circuit 114 can be replaced with the self-driven active clamp circuit 214. In other embodiments, the converter 200 can be designed and or manufactured to include the self-driven active clamp circuit 214. In such embodiments, control of the converter 200 is advantageously simplified as compared to conventional solutions FIG. 3 is a simplified circuit schematic of the self-driven active clamp circuit 214 of the converter 200 introduced with reference to FIG. 2, in accordance with some embodiments. Some elements of the self-driven active clamp circuit 214 have been omitted from FIG. 3 to simplify the description of the self-driven active clamp circuit 214 but are understood to be present.

The active clamp circuit 214 prevents the voltage $V_{dsM1}$ from increasing to a level that damages the main switch M1. The active clamp circuit 214 generally includes an active clamp capacitor C3, an active clamp switch M3, a delay circuit 302, an active clamp controller circuit 304, a gate driver circuit 306, and a voltage divider circuit 313. The delay circuit 302 generally includes resistors R4, R5, R6, capacitor C4, and a voltage comparison circuit 310. The active clamp controller circuit 304 generally includes a voltage comparison circuit 316 and a logic circuit 318. In some embodiments, the active clamp controller circuit 304 includes a reference voltage source 312 (e.g., a bandgap). In other embodiments, the reference voltage source 312 is outside of the active clamp controller circuit 304. In the embodiment shown, the voltage divider circuit 313 includes resistors R2, R3. In other embodiments, the voltage divider circuit 313 includes other, or additional, circuit components suitable for generating an attenuated voltage based on an input voltage. The active clamp switch M3 includes a body-diode, a drain node ('D'), a source node ('S'), and a gate node ('G') (i.e., a switch control node).

The active clamp capacitor C3 is connected in a series circuit combination with the active clamp switch M3. The active clamp controller circuit 304 is coupled to the gate node G of the active clamp switch M3 through the gate driver circuit 306. The gate driver circuit 306 is coupled to a bias voltage Vcc and to the node 210 to receive a rail voltage. The active clamp controller circuit 304 is configured to receive an active clamp switch voltage ($V_{ac}$) 307 at node 308. The active clamp switch voltage 307 is based on a voltage developed across the drain node D and the source node S of the active clamp switch M3 ($V_{dsM3}$). The active clamp controller circuit 304 enables (i.e., turns on) the active clamp switch M3 based on a voltage amplitude of the active clamp switch voltage 307 and disables (i.e., turns off) the active clamp switch M3 based on a delay signal 305 generated by the delay circuit 302 at the expiration of a time delay. The time delay provided by the delay circuit 302 is initiated in response to the active clamp switch M3 being enabled and expires after a duration of the delay has elapsed. Upon receiving the delay signal 305, the active clamp controller circuit 304 disables the active clamp switch M3.

The active clamp switch voltage ($V_{ac}$) 307 is generated by the voltage divider circuit 313 that is directly connected across the drain node D and the source node S of the active clamp switch M3 to receive the drain-source voltage $V_{dsM3}$ of the active clamp switch M3. In some embodiments, the voltage divider circuit 313 includes a series combination of the resistors R2 and R3. In such embodiments, a first terminal of the resistor R2 is directly connected to the drain node D of the active clamp switch M3, a second terminal of the resistor R2 is coupled to a first terminal of the resistor R3, and a second terminal of the resistor R3 is directly connected to the source node S of the active clamp switch M3.

The reference voltage source 312 generates a reference voltage 314. The voltage comparison circuit (e.g., a comparator) 316 receives the active clamp switch voltage 307 from the node 308 at a negative terminal ('−') and receives the reference voltage 314 at a positive terminal ('+'). The voltage comparison circuit 316 generates a voltage comparison signal ($V_{cmp}$) 317 based on a comparison of the active clamp switch voltage 307 and the reference voltage 314. In such embodiments, the active clamp switch M3 is enabled when the active clamp switch voltage 307 is less than the reference voltage 314.

The logic circuit 318 includes a set-reset (SR) latch circuit. A SET terminal of the of the SR latch circuit of the logic circuit 318 is configured to receive the voltage comparison signal 317. In response to receiving the positive edge of the voltage comparison signal 317 at the SET terminal, the logic circuit 318 emits a pulse-width-modulation (PWM) signal 319 (i.e., an active clamp switch control signal $PWM_{M3}$) at a first level (e.g., an asserted level) to enable the active clamp switch M3.

During light-load operation of the converter 200, the drain-source voltage can be several hundred volts less than during non light-load operation. Advantageously, in addition to acting as a voltage divider, the series combination of the resistors R2, R3 implements a low-power mode for the active clamp circuit 214. That is, the drain-source voltage $V_{dsM3}$ has to rise to a large enough level before the voltage comparison signal 317 at the SET terminal is asserted.

A RESET terminal of the SR latch circuit of the logic circuit 318 is configured to receive the delay signal 305. In response to receiving the delay signal 305 at the RESET terminal, the logic circuit 318 emits the $PWM_{M3}$ signal 319 at a second level (e.g., a de-asserted level) to disable the active clamp switch M3. In addition, the logic circuit 318 is configured to receive a power-on-reset (POR) signal at a POR terminal from a node 320 and is configured to receive an over-temperature-protection (OTP) signal at an OTP terminal from a node 322. The logic circuit 318 is configured to disable the active clamp switch M3 in response to receiving either of the POR or the OTP signal. In some embodiments, the POR signal is generated by a POR circuit (not shown) and the OTP signal is generated by an OTP circuit (not shown). Circuits configured to generate POR and OTP signals are understood by one of ordinary skill in the art.

The delay circuit 302 includes a resistor divider circuit of the series connected resistors R4, R5, configured to receive the bias voltage Vcc at a first terminal and a voltage Vs from the source node of the active clamp switch M3 at a second terminal. The resistor divider circuit R4, R5 generates a delay threshold voltage ($V_{thr}$) 309 which is received at a negative terminal ('−') of the voltage comparison circuit 310. A resistor-capacitor (RC) circuit of the capacitor C4 and the resistor R5 receives the $PWM_{M3}$ signal 319 and generates a ramp signal ($V_{RC}$) 311 as the capacitor C4 is charged by the $PWM_{M3}$ signal 319. The voltage comparison circuit 310 receives the ramp signal 311 at a positive terminal ('+') and compares the ramp signal 311 to the delay threshold voltage 309. When the ramp signal 311 is equal to or greater than the delay threshold voltage 309, the voltage comparison circuit 310 emits the delay signal 305. Thus, a duration of the delay provided by the delay circuit 302 is configured based on a choice of values of the resistors R4, R5, R6 and of the capacitor C4. The delay signal 305 is received at the RESET terminal of the logic circuit 318, and in response, the logic circuit 318 disables the active clamp switch M3 by emitting the PWM$_{M3}$ signal 319 at the second level as previously described.

The gate driver circuit 306 drives (i.e., enables and disables) the active clamp switch M3. In some embodiments, the active clamp switch M3 is a current-bidirectional two-quadrant switch. The gate node G of the active clamp switch M3 controls a conduction of current between the drain node D and the source node S. The drain node D and the source node S of the active clamp switch M3 are in a series circuit combination with the active clamp capacitor C3. In some embodiments, the active clamp switch M3 includes a diode, other than a body-diode, which is configured to pass a current between the source node S and the drain node D (in a first current direction) when the diode is forward biased (e.g., when sufficient voltage is developed across the source and drain of the active clamp switch M3). When the gate node G of the active clamp switch M3 is driven by the switch control signal, the active clamp switch M3 passes current bidirectionally (e.g., in the first current direction, and/or a second current direction). In the first current direction, current flows from the primary winding 104, through the active clamp switch M3, and into the active clamp capacitor C3. In the second current direction, current flows from the active clamp capacitor C3, through the active clamp switch M3, and into the primary winding 204.

During a portion of the switching cycle when the main switch M1 and active clamp switch M3 are both off, the active clamp switch current $i_{sd}$ flows from the primary winding 204, through the body-diode of the active clamp switch M3, to the active clamp capacitor C3. During a subsequent portion of the switching cycle when the main switch M1 is off and the active clamp switch M3 is on, the current $i_{sd}$ oscillates between the active clamp capacitor C3, the magnetizing inductance $L_M$, and other intended or parasitic reactive elements of the converter 200.

Figure 4:
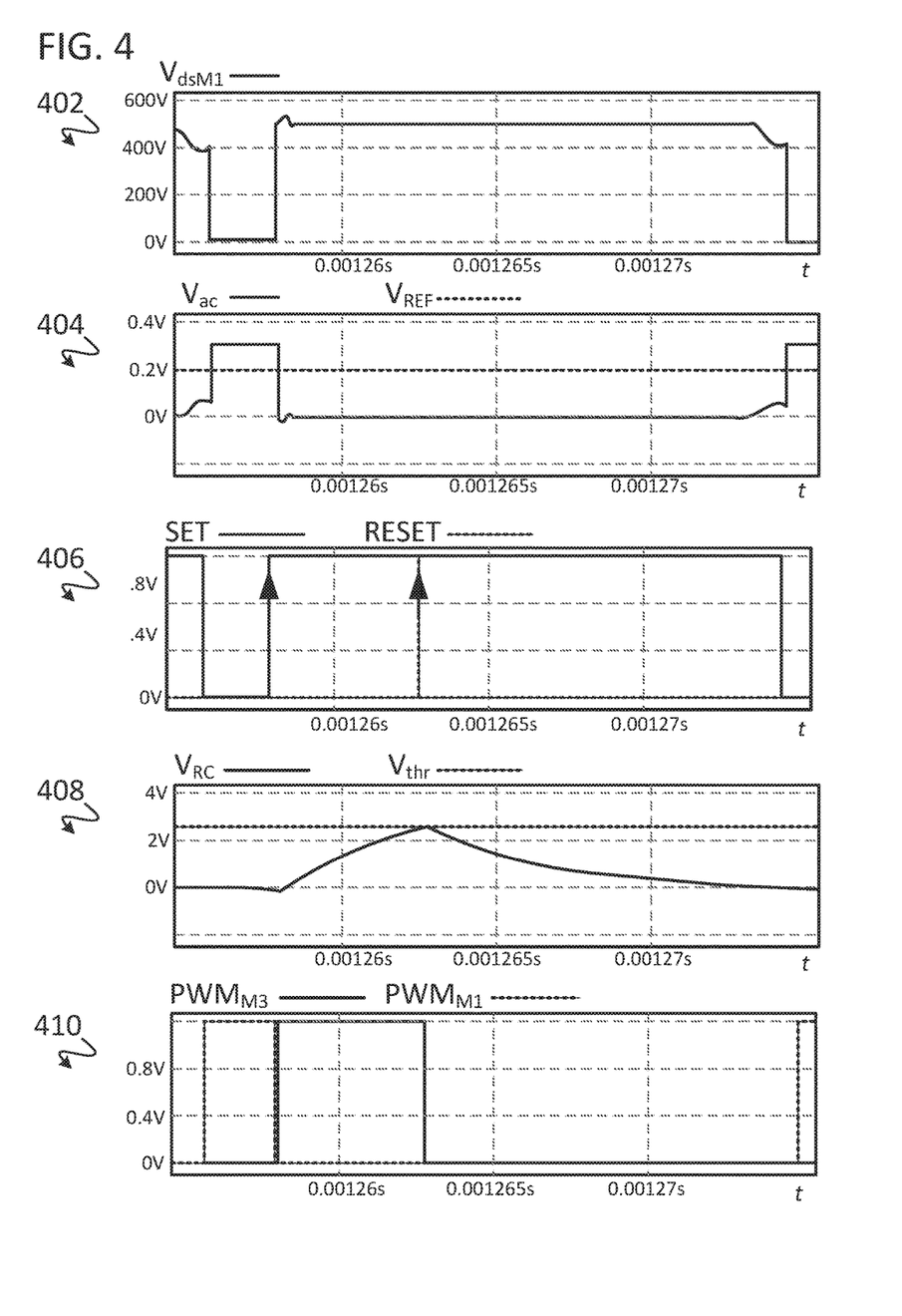
FIG. 4 shows simplified plots of signals related to the low-cost self-driven active clamp circuit shown in FIG. 3, in accordance with some embodiments.

FIG. 4 provides simplified example plots 402, 404, 406, 408, and 410 which illustrate a relationship between signals of the converter 200, including those of the active clamp circuit 214, across a window of time, in accordance with some embodiments. The plot 402 illustrates the full-range voltage drain-source voltage ($V_{dsM1}$) of the main switch M1 across the window of time. The plot 404 show the active clamp switch voltage ($V_{ac}$) 307 at node 308. As the voltage $V_{dsM1}$ at the drain node of the main switch M1 rises, the active clamp switch voltage ($V_{ac}$) will correspondingly fall (i.e., as measured relative to the drain node D of the active clamp switch M3). When the active clamp switch voltage ($V_{ac}$) 307 falls to a voltage level that is less than the reference voltage 314 (shown as a dashed line $V_{REF}$), the voltage comparison circuit 316 asserts a rising edge on the SET input of the SR latch circuit of the logic circuit 318, as shown in the plot 406. In response, the logic circuit 318 emits an asserted PWM$_{M3}$ signal, as shown in the plot 410, thereby enabling the active clamp switch M3 and clamping (i.e., limiting) the voltage $V_{dsM1}$ at the node 210 to a maximum voltage that is within a safe operating range of the main switch M1. For example, in some embodiments, the maximum voltage is a voltage that is less than a maximum operating voltage of the main switch M1.

The asserted PWM$_{M3}$ signal also initiates a time delay of the delay circuit 302. The plot 408 shows the ramp signal ($V_{RC}$) 311 rising in response to the asserted PWM$_{M3}$ signal. When the ramp signal ($V_{RC}$) 311 is equal to or greater than the delay threshold voltage (V) 309, the delay circuit 302 asserts a rising edge on the RESET input of the SR latch circuit of the logic circuit 318, as shown in the plot 406. In response, the logic circuit 318 emits a de-asserted PWM$_{M3}$ signal, as shown in the plot 410, thereby disabling the active clamp switch M3.

Figure 5:
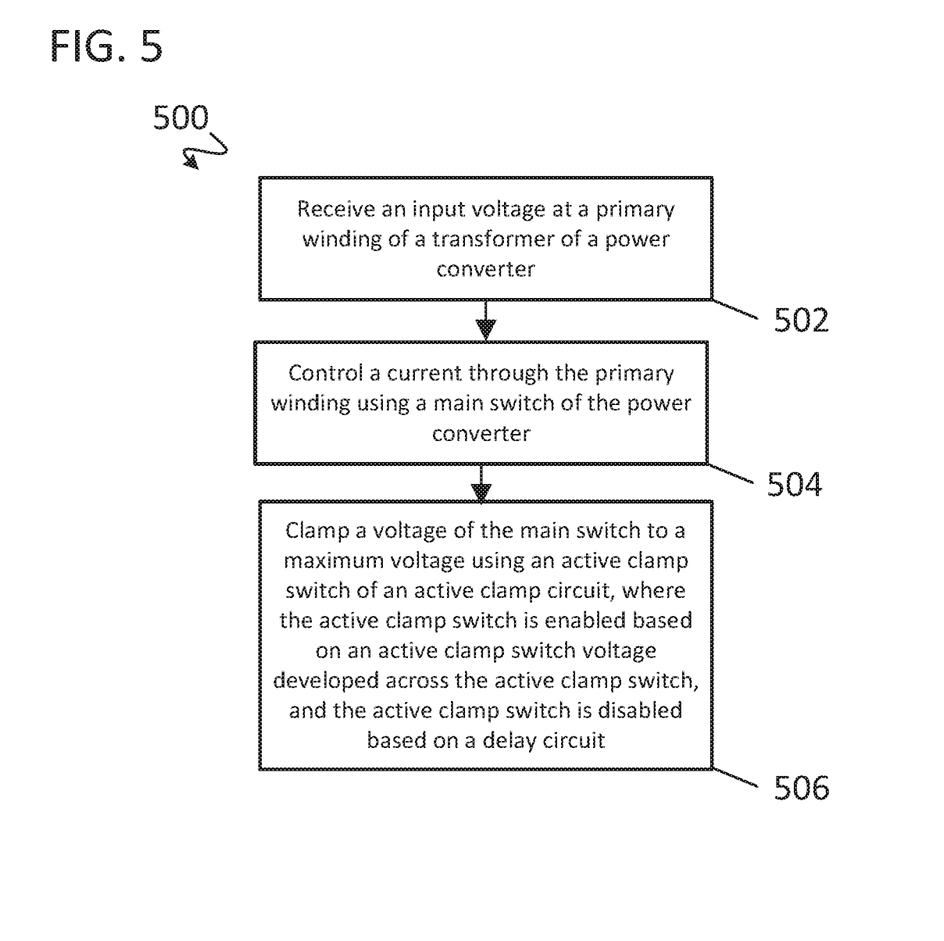
FIG. 5-6 are portions of a process for clamping a voltage of a main switch of the power converter shown in FIG. 2 using the self-driven active clamp circuit shown in FIG. 3, in accordance with some embodiments.

FIG. 5 is a portion of an example process 500 for clamping a voltage of a main switch of a power converter (e.g., the converter 200), in accordance with some embodiments. The particular steps, order of steps, and combination of steps are shown for illustrative and explanatory purposes only. Other embodiments can implement different particular steps, orders of steps, and combinations of steps to achieve similar functions or results. At step 502, an input voltage is received at a primary winding (204) of a transformer (202) of the power converter (200). At step 504, a current through the primary winding (204) is controlled using a main switch (M1) of the power converter (200). At step 506, a voltage of the main switch (i.e., at the second node 210) is clamped to a maximum voltage using an active clamp switch (M3) of an active clamp circuit (214). The active clamp switch (M3) is enabled based on an active clamp switch voltage ($V_{ac}$) developed across the active clamp switch (M3), and the active clamp switch (M3) is disabled based on a delay circuit (302).

Figure 6:
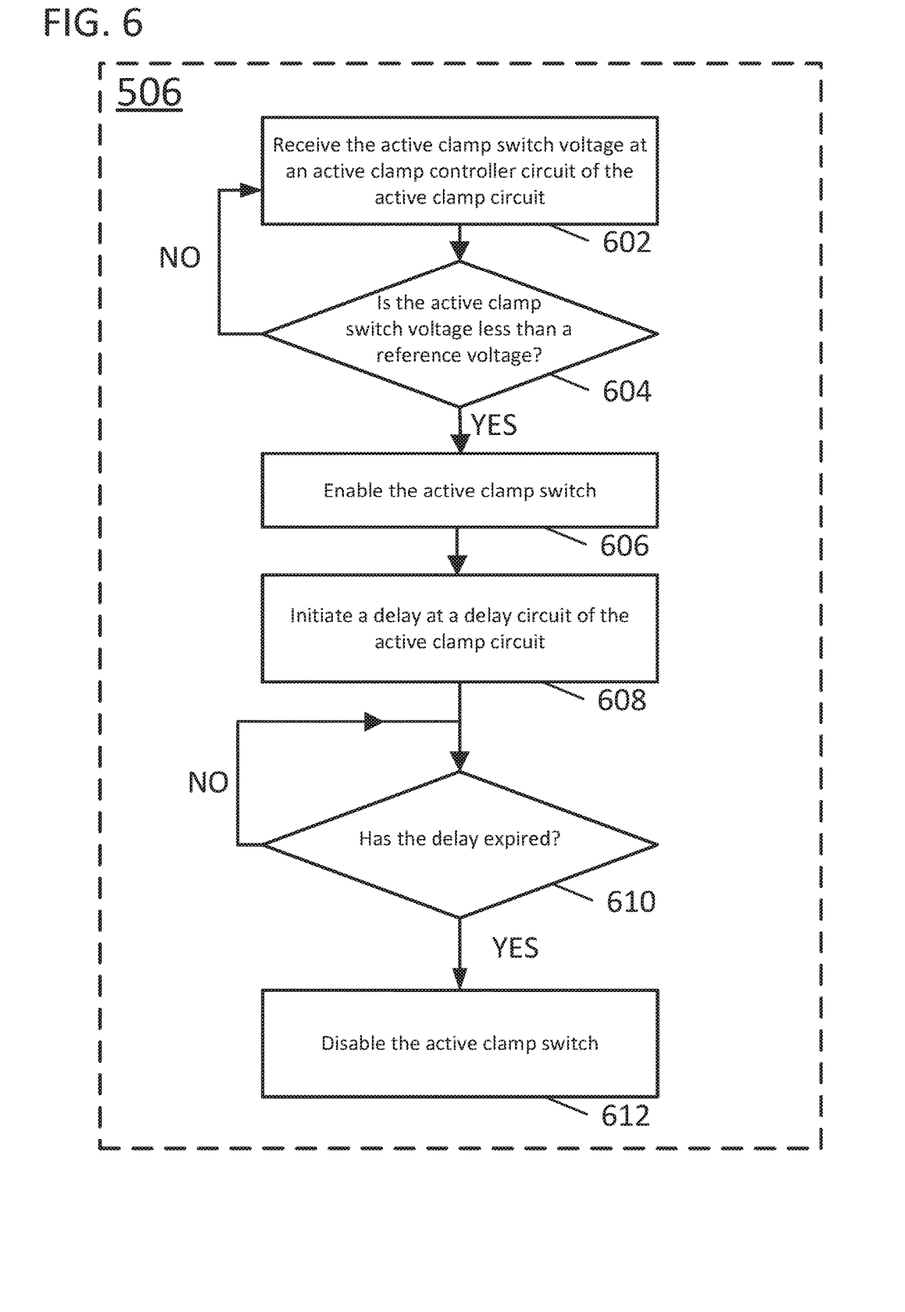

Details of step 506 are presented in FIG. 6, in accordance with some embodiments. The particular steps, order of steps, and combination of steps are shown for illustrative and explanatory purposes only. Other embodiments can implement different particular steps, orders of steps, and combinations of steps to achieve similar functions or results.

At step 602, the active clamp switch voltage ($V_{ac}$) is received at an active clamp controller circuit (304) of the active clamp circuit (214). At step 604, it is determined if the active clamp switch voltage (307) is less than a reference voltage (314). If the active clamp switch voltage (307) is not less than the reference voltage (314), flow returns to step 602. Advantageously, if the active clamp switch M3 voltage $V_{dsM3}$ never rises above the reference voltage (314) (e.g., during light-load-operation of the power converter 200), the process flow will remain at step 602. If, at step 604, it is determined that the active clamp switch voltage (307) is less than the reference voltage (314), flow continues to step 606. At step 606, the active clamp switch (M3) is enabled. When the active clamp switch (M3) is enabled, the active clamp circuit (214) clamps (i.e., limits) a voltage of a main switch (M1) of the power converter (200). At step 608, in response to the active clamp switch (M3) being enabled, a delay at a delay circuit (302) of the active clamp circuit 214 is initiated. At 610, it is determined if the delay that was initiated at step 608 has expired. If the delay has not expired, flow remains at step 610. If it is determined a step 610 that the delay has expired, flow continues to step 612. At step 612, the active clamp switch (M3) is disabled. When the active clamp switch (M3) is disabled, the active clamp circuit (214) is no longer clamping a voltage of a main switch (M1) of the power converter (200).

Reference has been made in detail to embodiments of the disclosed invention, one or more examples of which have been illustrated in the accompanying figures. Each example has been provided by way of explanation of the present technology, not as a limitation of the present technology. In fact, while the specification has been described in detail with respect to specific embodiments of the invention, it will be appreciated that those skilled in the art, upon attaining an understanding of the foregoing, may readily conceive of alterations to, variations of, and equivalents to these embodiments. For instance, features illustrated or described as part of one embodiment may be used with another embodiment to yield a still further embodiment. Thus, it is intended that the present subject matter covers all such modifications and variations within the scope of the appended claims and their equivalents. These and other modifications and variations to the present invention may be practiced by those of ordinary skill in the art, without departing from the scope of the present invention, which is more particularly set forth in the appended claims. Furthermore, those of ordinary skill in the art will appreciate that the foregoing description is by way of example only and is not intended to limit the invention.

What is claimed is:

1. An active clamp circuit comprising:
   an active clamp switch having a drain node and a source node;
   an active clamp capacitor coupled in a series combination with the active clamp switch;
   a delay circuit; and
   an active clamp controller circuit coupled to the active clamp switch and to the delay circuit, the active clamp controller circuit being configured to i) receive an active clamp switch voltage based on a voltage developed across the drain node and the source node of the active clamp switch, ii) enable the active clamp switch based on a voltage amplitude of the active clamp switch voltage, and iii) disable the active clamp switch based on a delay signal generated by the delay circuit;
   wherein the delay circuit comprises:
   a resistor divider circuit to receive a bias voltage and a voltage from the source node of the active clamp switch to generate a delay threshold voltage;
   a resistor-capacitor (RC) circuit to receive an active clamp switch control signal and the voltage from the source node of the active clamp switch to generate a ramp signal in response to the active clamp switch control signal, the active clamp switch control signal being configured to enable and disable the active clamp switch; and
   a first voltage comparison circuit configured to i) receive the delay threshold voltage, ii) receive the ramp signal, iii) compare the ramp signal to the delay threshold voltage, and iv) disable the active clamp switch based on a comparison of the ramp signal and the delay threshold voltage.

2. The active clamp circuit of claim 1, wherein:
   a delay of the delay circuit is initiated in response to the active clamp switch being enabled and expires after a duration of the delay has elapsed, the active clamp switch being disabled after the duration of the delay has elapsed.

3. The active clamp circuit of claim 2, wherein:
   the duration of the delay is inversely proportional to a switching frequency of the active clamp switch.

4. The active clamp circuit of claim 1, further comprising:
   a voltage divider circuit directly connected across the drain node and the source node of the active clamp switch;
   wherein:
   the voltage divider circuit is configured to generate the active clamp switch voltage based on the voltage developed across the drain node and the source node of the active clamp switch; and
   the active clamp controller circuit is configured to receive the active clamp switch voltage from the voltage divider circuit.

5. The active clamp circuit of claim 4, wherein the active clamp controller circuit further comprises:
   a second voltage comparison circuit that is configured to i) receive the active clamp switch voltage, ii) receive a reference voltage, and iii) generate a voltage comparison signal based on a comparison of the active clamp switch voltage and the reference voltage;
   wherein:
   the active clamp switch is enabled based on the voltage comparison signal.

6. The active clamp circuit of claim 5, wherein the active clamp controller circuit further comprises:
   a logic circuit comprising a SET-RESET (SR) latch circuit;
   wherein:
   a SET terminal of the SR latch circuit is configured to receive the voltage comparison signal, the SR latch circuit being configured to enable the active clamp switch in response to receiving, at the SET terminal, the voltage comparison signal; and
   a RESET terminal of the SR latch circuit is configured to receive the delay signal generated by the delay circuit, the SR latch circuit being configured to disable the active clamp switch in response to receiving, at the RESET terminal, the delay signal.

7. The active clamp circuit of claim 1, wherein:
   the active clamp controller circuit is configured to receive an over-temperature indication signal and to receive a power-on-reset signal; and
   the active clamp controller circuit is configured to disable the active clamp switch in response to receiving either of the over-temperature indication signal or the power-on-reset signal.

8. The active clamp circuit of claim 1, wherein:
   the active clamp switch is coupled to a node of another switch; and
   the active clamp switch clamps a voltage at the node of the other switch to a maximum voltage.

9. The active clamp circuit of claim 8, wherein:
   the node of the other switch is coupled to a winding of a transformer; and
   the other switch controls a current through the winding of the transformer.

10. A power converter comprising:
    a transformer having a primary winding and a secondary winding, a first winding node of the primary winding being configured to be coupled to a voltage source to receive an input voltage, the secondary winding being configured to be coupled to a load to provide an output voltage from the input voltage;
    a main switch coupled to a second winding node of the primary winding to control a current through the primary winding; and
    an active clamp circuit comprising:
    an active clamp switch having a drain node and a source node;
    an active clamp capacitor coupled in a series circuit combination with the active clamp switch;
    a delay circuit; and
    an active clamp controller circuit coupled to the active clamp switch and to the delay circuit, the active clamp controller circuit being configured to i) receive an active clamp switch voltage based on a voltage developed across the drain node and the source node of the active clamp switch, ii) enable the active clamp switch based on a voltage amplitude of the active clamp switch voltage, and iii) disable the active clamp switch based on a delay signal generated by the delay circuit;

wherein the delay circuit comprises:

a resistor divider circuit to receive a bias voltage and a voltage from the source node of the active clamp switch to generate a delay threshold voltage;

a resistor-capacitor (RC) circuit to receive an active clamp switch control signal and the voltage from the source node of the active clamp switch to generate a ramp signal, the active clamp switch control signal being configured to enable and disable the active clamp switch; and a first voltage comparison circuit configured to i) receive the delay threshold voltage, ii) receive the ramp signal, and iii) generate the delay signal based on a comparison of the delay threshold voltage to the ramp signal;

wherein:

the active clamp controller circuit is configured to disable the active clamp switch in response to receiving the delay signal.

11. The power converter of claim 10, further comprising:

a voltage divider circuit directly connected across the drain node and the source node of the active clamp switch;

wherein:

the voltage divider circuit is configured to generate the active clamp switch voltage based on the voltage developed across the drain node and the source node of the active clamp switch; and the active clamp controller circuit is configured to receive the active clamp switch voltage from the voltage divider circuit.

12. The power converter of claim 11, wherein the active clamp controller circuit further comprises:

a second voltage comparison circuit that is configured to i) receive the active clamp switch voltage, ii) receive a reference voltage, and iii) generate a voltage comparison signal based on a comparison of the active clamp switch voltage and the reference voltage;

wherein:

the active clamp switch is enabled based on the voltage comparison signal.

13. The power converter of claim 12, wherein the active clamp controller circuit further comprises:

a SET-RESET (SR) latch circuit;

wherein:

a SET terminal of the SR latch circuit is configured to receive the voltage comparison signal, the SR latch circuit being configured to enable the active clamp switch in response to receiving the voltage comparison signal at the SET terminal; and a RESET terminal of the SR latch circuit is configured to receive the delay signal generated by the delay circuit, the SR latch circuit being configured to disable the active clamp switch in response to receiving the delay signal at the RESET terminal.

14. The power converter of claim 10, wherein:

the active clamp controller circuit is configured to receive an over-temperature indication signal and to receive a power-on-reset signal; and the active clamp controller circuit is configured to disable the active clamp switch in response to receiving either of the over-temperature indication signal or the power-on-reset signal.

15. The power converter of claim 10, further comprising:

a main switch controller circuit that is communicatively coupled to the main switch to control a power transfer from the primary winding to the secondary winding;

wherein:

the active clamp controller circuit is communicatively isolated from the main switch controller circuit.

16. The power converter of claim 10, wherein:

the active clamp switch is a current-bidirectional two-quadrant switch;

the source node and the drain node of the active clamp switch are in the series circuit combination with the active clamp capacitor; and a switch control node of the active clamp switch is coupled to the active clamp controller circuit to control an active clamp switch current between the drain node and the source node of the active clamp switch.

17. The power converter of claim 16, wherein:

the active clamp switch is configured to pass the active clamp switch current between the source node and the drain node in response to a voltage developed across the source node and the drain node; and the active clamp switch is configured to pass the active clamp switch current between the drain node and the source node in response to a switch control signal received at the switch control node.

* * * * *